United States Patent
Song (10) Patent No.: US 8,005,466 B2
(45) Date of Patent: Aug. 23, 2011

(54) REAL TIME REPRODUCTION METHOD OF FILE BEING RECEIVED ACCORDING TO NON REAL TIME TRANSFER PROTOCOL AND A VIDEO APPARATUS THEREOF

(75) Inventor: Min-suk Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 905 days.

(21) Appl. No.: 11/942,852

(22) Filed: Nov. 20, 2007

(65) Prior Publication Data

US 2008/0194202 A1  Aug. 14, 2008

(30) Foreign Application Priority Data

Feb. 14, 2007  (KR) .......................... 10-2007-0015537
May 30, 2007  (KR) .......................... 10-2007-0052668

(51) Int. Cl.
*H04L 29/08* (2006.01)

(52) U.S. Cl. ............... 455/414.4; 455/432.2; 455/414.1; 370/395.3; 370/353; 709/238

(58) Field of Classification Search ............... 455/414.4, 455/432.2, 414.1, 168.1, 418; 370/395.3, 370/353, 354, 498, 493; 709/238, 244
See application file for complete search history.

(56) References Cited

U.S. PATENT DOCUMENTS

| | | | | |
|---|---|---|---|---|
| 5,373,493 A * | 12/1994 | Iizuka | .................... | 369/124.14 |
| 6,037,981 A * | 3/2000 | Wilson et al. | ............ | 375/240.12 |
| 6,577,633 B1 * | 6/2003 | Kunito et al. | .............. | 370/395.3 |
| 6,757,273 B1 * | 6/2004 | Hsu et al. | ...................... | 370/349 |
| 7,363,096 B2 * | 4/2008 | Wiser et al. | ..................... | 700/94 |
| 7,368,918 B2 * | 5/2008 | Henson et al. | ................ | 324/536 |
| 7,453,897 B2 | 11/2008 | Enbom et al. | | |
| 7,593,619 B2 * | 9/2009 | Yamasaki | ..................... | 386/248 |
| 7,685,618 B1 * | 3/2010 | Paskins | .......................... | 725/41 |
| 7,762,470 B2 * | 7/2010 | Finn et al. | ..................... | 235/492 |
| 7,890,735 B2 * | 2/2011 | Tran | ............................. | 712/215 |
| 7,890,975 B2 * | 2/2011 | Paskins | .......................... | 725/41 |
| 2001/0051037 A1 * | 12/2001 | Safadi et al. | .................... | 386/83 |

(Continued)

FOREIGN PATENT DOCUMENTS

CN  1564984 A  1/2005

(Continued)

OTHER PUBLICATIONS

Communication and European Search Report issued on Aug. 24, 2010 in counterpart European Application No. 07122392.9.

(Continued)

*Primary Examiner* — Minh D Dao
(74) *Attorney, Agent, or Firm* — Sughrue Mion, PLLC (57) ABSTRACT

Provided are a real time reproduction method of a file being received according to a non real time transfer protocol and a video apparatus thereof. The video apparatus includes a communication module which is connected to an external device to communicate with the external device; a buffer which stores data received through the communication module; a decoder which decodes input data; a controller which stores data constituting a file received from the external device in the buffer via the communication module according to a non real time transfer protocol, and inputs a part of the data stored in the buffer to the decoder before all of data constituting the file is completely received; and an output unit which reproduces data decoded at the decoder in a real time.

24 Claims, 7 Drawing Sheets

U.S. PATENT DOCUMENTS

| | | |
|---|---|---|
| 2003/0091160 A1 | 5/2003 | Enbom et al. |
| 2003/0144942 A1* | 7/2003 | Sobek .............................. 705/36 |
| 2004/0247284 A1* | 12/2004 | Yamasaki ....................... 386/52 |
| 2005/0015528 A1* | 1/2005 | Du .................................. 710/68 |
| 2005/0248476 A1* | 11/2005 | Wiser et al. ..................... 341/50 |
| 2006/0023702 A1 | 2/2006 | Pulitzer |
| 2006/0059200 A1* | 3/2006 | Sakai et al. ................. 707/104.1 |
| 2007/0179953 A1* | 8/2007 | Mahoney et al. .................. 707/9 |
| 2007/0220342 A1* | 9/2007 | Vieira et al. ..................... 714/33 |
| 2007/0286202 A1* | 12/2007 | Dos Remedios et al. .. 370/395.2 |
| 2008/0045804 A1* | 2/2008 | Williams ....................... 600/300 |
| 2008/0117899 A1* | 5/2008 | Sullivan et al. ............... 370/389 |
| 2008/0301154 A1* | 12/2008 | Vithayathil ................... 707/100 |
| 2009/0037536 A1* | 2/2009 | Braam .......................... 709/206 |
| 2009/0100096 A1* | 4/2009 | Erlichson et al. .......... 707/104.1 |
| 2009/0128502 A1* | 5/2009 | Li et al. ......................... 345/173 |
| 2009/0222585 A1* | 9/2009 | Khalil et al. .................. 709/246 |
| 2009/0298473 A1* | 12/2009 | Choi et al. .................. 455/412.1 |
| 2010/0057448 A1* | 3/2010 | Massimino et al. .......... 704/222 |
| 2010/0150166 A1* | 6/2010 | Carmel ......................... 370/437 |
| 2010/0162311 A1* | 6/2010 | Paskins ............................ 725/41 |
| 2010/0260266 A1* | 10/2010 | Gholmieh et al. ....... 375/240.25 |
| 2011/0002308 A1* | 1/2011 | Nagasawa et al. ............ 370/332 |

FOREIGN PATENT DOCUMENTS

| | | |
|---|---|---|
| WO | 03/029990 A1 | 4/2003 |

OTHER PUBLICATIONS

Communication from the State Intellectual Property Office of P.R. China dated Jun. 2, 2011, in Application No. 200710197152.5.

* cited by examiner

REAL TIME REPRODUCTION METHOD OF FILE BEING RECEIVED ACCORDING TO NON REAL TIME TRANSFER PROTOCOL AND A VIDEO APPARATUS THEREOF

CROSS-REFERENCE TO RELATED APPLICATIONS

This application claims priority under 35 U.S.C. §119 from Korean Patent Application Nos. 2007-0015537, filed on Feb. 14, 2007, and 2007-0052668, filed on May 30, 2007, in the Korean Intellectual Property Office, the disclosures of which are incorporated herein by reference in their entireties.

BACKGROUND OF THE INVENTION

1. Field of the Invention

Apparatuses and methods consistent with the present invention relate to a data reproduction, and more particularly, to reproducing a file being received from an external device in real time.

2. Description of the Related Art

With the advance of radio communication and networking technologies, devices constituting a network are able to wirelessly transmit and receive files and thus utilize a file stored to one device.

Multimedia file transfer between the devices constituting the network can be performed in real time or in non real time. Protocols are provided for the respective cases. The real time transfer protocol supports the reproduction of the multimedia file before a device receiving the multimedia file completes the file reception. By contrast, the non real time transfer protocol supports the multimedia file reproduction only after the reception of the multimedia file is finished.

Audio Video (AV) Protocol is one of the real time transfer protocols applied to the wireless network constructed according to Bluetooth. In the AV protocol, a Bluetooth device A can reproduce a file in real time while receiving the file from a Bluetooth device B.

However, the AV protocol does not support a function which enables the Bluetooth device A to receive a list of files stored to the Bluetooth device B.

As a result, a user of the Bluetooth device A can not select his/her intended multimedia file to be reproduced from the multimedia files stored to the Bluetooth device B. To enable the user to select the intended multimedia file from the Bluetooth device B, the user needs to move to the location of the Bluetooth device B and then select the intended file by manipulating the Bluetooth device B in person.

Also, to change the multimedia file being reproduced at the Bluetooth device A, the user needs to move to the location of the Bluetooth device B and then select another intended file by personally manipulating the Bluetooth device B. Therefore, the user is inconvenienced.

To address those drawbacks, it is necessary to amend the AV protocol or establish a protocol which supports a function enabling the Bluetooth device A to receive the list of the files stored to the Bluetooth device B, which is the complicated subject in practice.

In the mean time, there may also be a Bluetooth device C which supports communications based on the non real time transfer protocol but does not support communications based on the real time transfer protocol. In this case, the Bluetooth device A can not even reproduce the file in real time while receiving the multimedia file from the Bluetooth device C.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for reproducing a file which is received according to a non real time transfer protocol, rather than a real time transfer protocol, in real time and a video apparatus thereof.

The present invention provides a reproducing method for avoiding interruption when a file, which is being received according to a non real time transfer protocol, is reproduced in real time, and a video apparatus thereof.

According to an aspect of the present invention, there is provided a video apparatus comprising a communication module which is connected to an external device to communicate with the external device; a buffer which stores data received through the communication module; a decoder which decodes input data; a controller which stores data constituting a file received from the external device via the communication module according to a non real time transfer protocol, in the buffer, and applies part of the data stored to the buffer to the decoder before all of data constituting the file is completely received; and an output unit which reproduces data decoded at the decoder in a real time.

The non real time transfer protocol may not support a multimedia streaming. The non real time transfer protocol may be a File Transfer Protocol (FTP).

The controller may control the receiving of a list of files stored in the external device from the external device via the communication module according to the non real time transfer protocol, and the outputting the received list through the output unit.

When data fed from the controller is completely decoded, the decoder may provide the decoded data to the output unit and request data to be decoded to the controller.

The controller may apply part of the data stored in the buffer to the decoder when the request is received from the decoder, request next data following the most recently received data in a file structure to the external device via the communication module, and store the next data received from the external device via the communication module according to the non real time transfer protocol to the buffer.

When the data to be decoded is completely received from the controller, the decoder may decode the data.

The communication module may be connected to the external device to enable radio communication with the external device. The communication module may be connected to the external device to enable radio communication using Bluetooth.

The file may be at least one of an audio file and a video file.

The video apparatus may further comprise a broadcast reception module which receives a broadcast signal. The decoder may decode a broadcast signal received at the broadcast reception module, and the output unit may output a broadcast of the broadcast signal decoded at the decoder.

According to the aspect of the present invention, a reproduction method comprises storing data constituting a file which is received from an external device according to a non real time transfer protocol; decoding part of the stored data before all of the data constituting the file is completely received; and reproducing the decoded data in real time.

The non real time transfer protocol may not support a multimedia streaming. The non real time transfer protocol may be a FTP.

The reproduction method may further comprise receiving a list of files stored to the external device from the external device according to the non real time transfer protocol; and outputting the received list.

The decoding operation may comprise applying, by a controller which stores the data constituting the received file in a buffer, part of the data stored in the buffer to a decoder which decodes the data before all of the data constituting the file is completely received; decoding, by the decoder, the data applied from the controller; providing, by the decoder, the decoded data to an output unit which reproduces the decoded data in real time when the data applied from the controller is completely decoded; and requesting, by the decoder, data to be decoded to the controller.

The decoding operation may further comprise applying, by the controller, part of the data stored to the buffer to the decoder when the request is received from the decoder; and requesting, by the controller, next data following the most recently received data in a file structure to the external data, and storing the next data received from the external device according to the non real time transfer protocol, to the buffer.

The decoding operation may further comprise decoding, by the decoder, the data, when the data to be decoded is completely received from the controller.

The storing operation may comprise storing data constituting a file which is wirelessly received from the external device. The storing operation may comprise storing data constituting a file which is wirelessly received from the external device using Bluetooth.

The file may be at least one of an audio file and a video file.

The reproduction method may further comprise decoding a received broadcast signal; and outputting a broadcast of the decoded broadcast signal.

According to another aspect of the present invention, there is provided a video apparatus comprising a communication module which is connected to an external device to communicate with the external device; a buffer which stores data received through the communication module; a decoder which decodes a part of the data stored in the buffer while the data constituting a file received from the external device via the communication module according to a non real time transfer protocol, are stored to the buffer; and an output unit which reproduces the data decoded at the decoder in real time.

The communication module may receive data from the external device according to the non real time transfer protocol even while the decoder decodes the data.

The video apparatus may further comprise a controller which controls the decoder to commence the decoding after data of the file greater than a reserve storage capacity are completely stored in the buffer.

The controller may calculate the reserve storage capacity using a transmission speed of a front portion of the file which is received through the communication module and stored to the buffer.

The controller may calculate an expected transmission time of the entire file using the transmission speed of the front portion of the file and a total capacity of the file, and calculate the reserve storage capacity using the expected transmission time, a reproduction time of the file, and the transmission speed of the front portion of the file.

The non real time transfer protocol may not support a multimedia streaming. The non real time transfer protocol may be a FTP.

The controller may control to receive a list of files stored to the external device from the external device through the communication module according to the non real time transfer protocol and to output the received list through the output unit.

The communication module may be connected to the external device to enable radio communication with the external device.

The communication module may be connected to the external device to enable radio communication with the external device using Bluetooth.

The file may be at least one of an audio file and a video file.

The video apparatus may further comprise a broadcast reception module which receives a broadcast signal. The decoder may decode a broadcast signal received at the broadcast reception module, and the output unit may output a broadcast of the broadcast signal decoded at the decoder.

According to another aspect of the present invention, there is provided a reproduction method comprising receiving and storing data constituting a file from an external device according to a non real time transfer protocol; decoding part of pre-stored data while the data is stored; and reproducing the decoded data in real time.

The decoding operation may comprise receiving and storing data from the external device according to the non real time transfer protocol even while part of pre-stored data is decoded.

The decoding operation may start to decode part of the pre-stored data after data of the file is completely stored exceeds a reserve storage capacity.

The reproduction method may further comprise calculating the reserve storage capacity using a transmission speed of a front portion of the file.

The calculating operation may comprise calculating an expected transmission time of the entire file using the transmission speed of the front portion of the file and a total capacity of the file; and calculating the reserve storage capacity using the expected transmission time, a reproduction time of the file, and the transmission speed of the front portion of the file.

The non real time transfer protocol may not support a multimedia streaming. The non real time transfer protocol is a FTP.

The reproduction method may further comprise receiving a list of files stored to the external device from the external device according to the non real time transfer protocol; and outputting the received list.

The storing operation may comprise wirelessly receiving the data from the external device and storing the data. The storing operation may comprise receiving the data from the external device using Bluetooth and storing the data.

The file may be at least one of an audio file and a video file.

According to further aspect of the present invention, there is provided a video apparatus comprising a communication module which is connected to an external device to communicate with the external device; a buffer which stores data constituting a file which is received from the external device through the communication module according to a non real time transfer protocol; a decoder which decodes part of data stored in the buffer; an output unit which reproduces data decoded at the decoder in real time; and a controller which calculates a reserve storage capacity using a transmission speed of a front portion of the file which is received through the communication module and stored in the buffer, and controls the decoder to commence the decoding after the data constituting the file exceeding the reserve storage capacity is completely stored in the buffer.

According to further aspect of the present invention, there is provided a reproduction method comprising calculating a reserve storage capacity using a transmission speed of a front portion of a file which is received from an external device according to a non real time transfer protocol and stored; starting to decode after data constituting the file is completely stored exceeds the reserve storage capacity; and reproducing the decoded data in real time.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE INVENTION

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
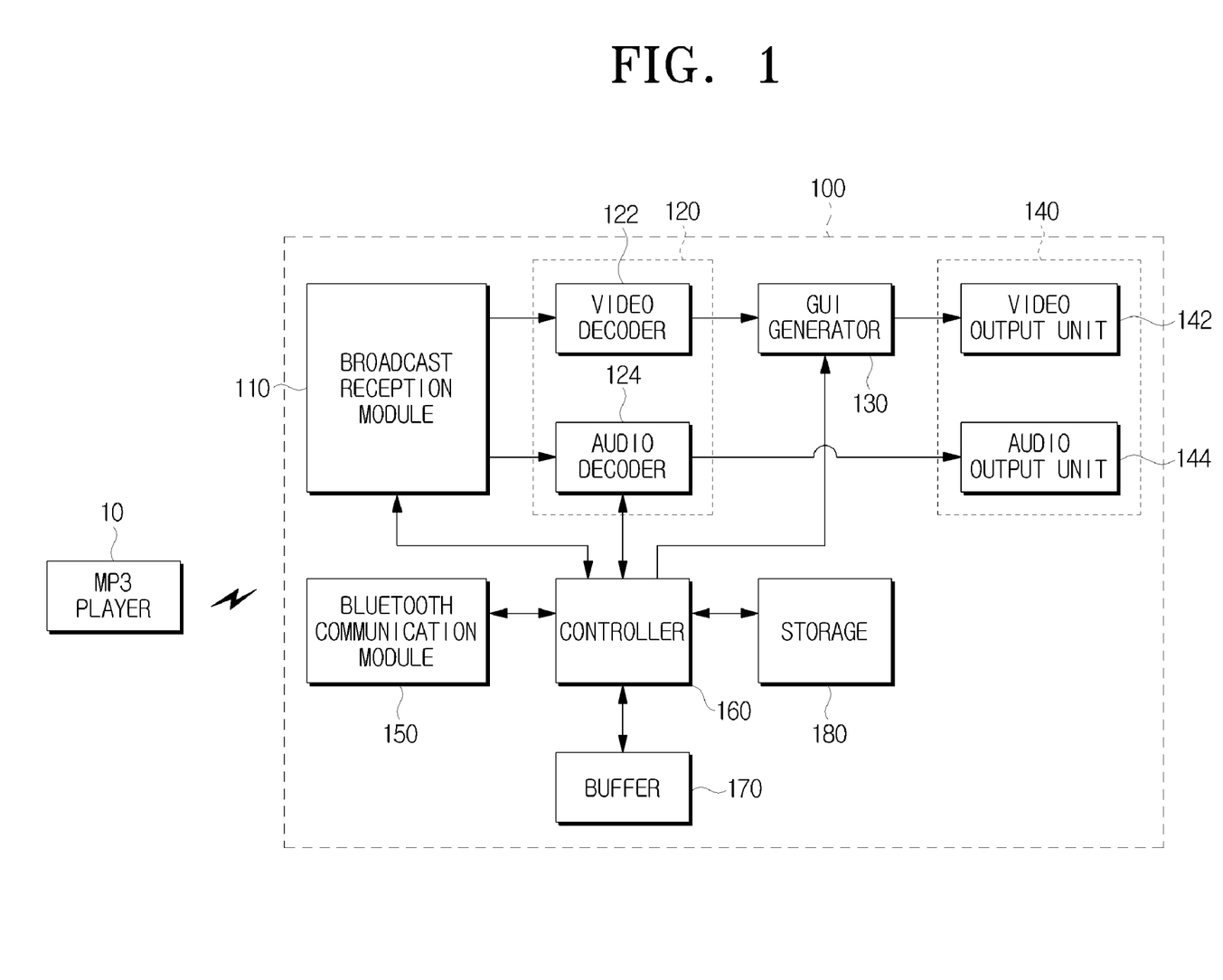
FIG. 1 is a block diagram of a DTV according to an exemplary embodiment of the present invention.

FIG. 1 is a block diagram of a DTV according to an exemplary embodiment of the present invention. Note that the DTV 100 of FIG. 1 can not only receive and provide broadcast to a user but also reproduce an audio file received from a Moving Picture Experts Groups Layer 3 (MP3) player 10 wirelessly connected in real time.

The DTV 100 can reproduce an audio file being received according to a File Transfer Protocol (FTP) which is one of non real time protocols, in real time. Namely, the DTV 100 can reproduce the file being received according to the FTP which does not support multimedia streaming, in real time.

The DTV 100 of FIG. 1 comprises a broadcast reception module 110, a decoder 120, a Graphic User Interface (GUI) generator 130, an output unit 140, a Bluetooth communication module 150, a controller 160, a buffer 170, and a storage unit 180.

The broadcast reception module 110 receives a broadcast signal from a broadcast station or a satellite in a wired or wireless manner. The broadcast reception module 110 splits the received broadcast signal to video data, audio data, and other data and then outputs them.

The decoder 120 decodes the received data. The decoder 120 comprises a video decoder 122 and an audio decoder 124.

The video decoder 122 decodes and converts the input video data into a reproducible format. The audio decoder 124 decodes and converts the input audio data into a reproducible format. The video decoder 122 and the audio decoder 124 can receive data from the broadcast reception module 110 or the controller 160 which will be described.

The GUI generator 130 generates a GUI to be displayed on a screen and adds the generated GUI to the video decoded and output from the video decoder 122.

The output unit 140 outputs video and audio, and comprises a video output unit 142 and an audio output unit 144.

The video output unit 142 displays the video comprising the GUI output from the GUI generator 130 on a display (not shown), or outputs the video to an external device (e.g., another DTV) connected through an external output port (not shown).

The audio output unit 144 outputs the audio output from the audio decoder 124 through a speaker (not shown), or outputs the audio to an external device connected through an external output port (not shown).

The Bluetooth communication module 150 is connected to the MP3 player 10, which provides Bluetooth function, to wirelessly communicate with the MP3 player 10. The Bluetooth communication module 150 performs radio communications with the MP3 player 10 according to Bluetooth protocol.

The controller 160 controls overall operation of the DTV 100. Specifically, the controller 160 controls the broadcast reception of the broadcast reception module 110, the communications of the Bluetooth communication module 150, the GUI generation of the GUI generator 130, and so forth.

The controller 160 stores audio data which is received from the MP3 player 10 via the Bluetooth communication module 150, to the buffer 170 or the storage unit 180. The storage unit 180 can be implemented using a recording medium (not shown) such as memory or Hard Disk Drive (HDD), or a controller (not shown) which stores audio data to the recording medium or reads the stored audio data from the recording medium.

Herein, the audio data can represent part of audio file. In other words, the audio file can comprise a plurality of audio data. When transmitting an audio file to the DTV 100, the MP3 player 10 divides the audio file into a plurality of audio data and transmits the divided audio data to the DTV 100 in succession.

To reproduce the audio file in real time, the controller 160 stores the audio data in the buffer 170. In contrast, to reproduce the audio file in non real time (the audio file is reproduced later after all of audio data constituting the audio file is received), the controller 160 stores the audio data to the storage unit 180.

In both cases of reproducing the audio file in real time and in non real time, the controller 160 receives the audio file from the MP3 player 10 via the Bluetooth communication module 150 according to the FTP. The controller 160 receives the audio data constituting the audio file to be reproduced in real time, according to the FTP as well.

Figure 2:
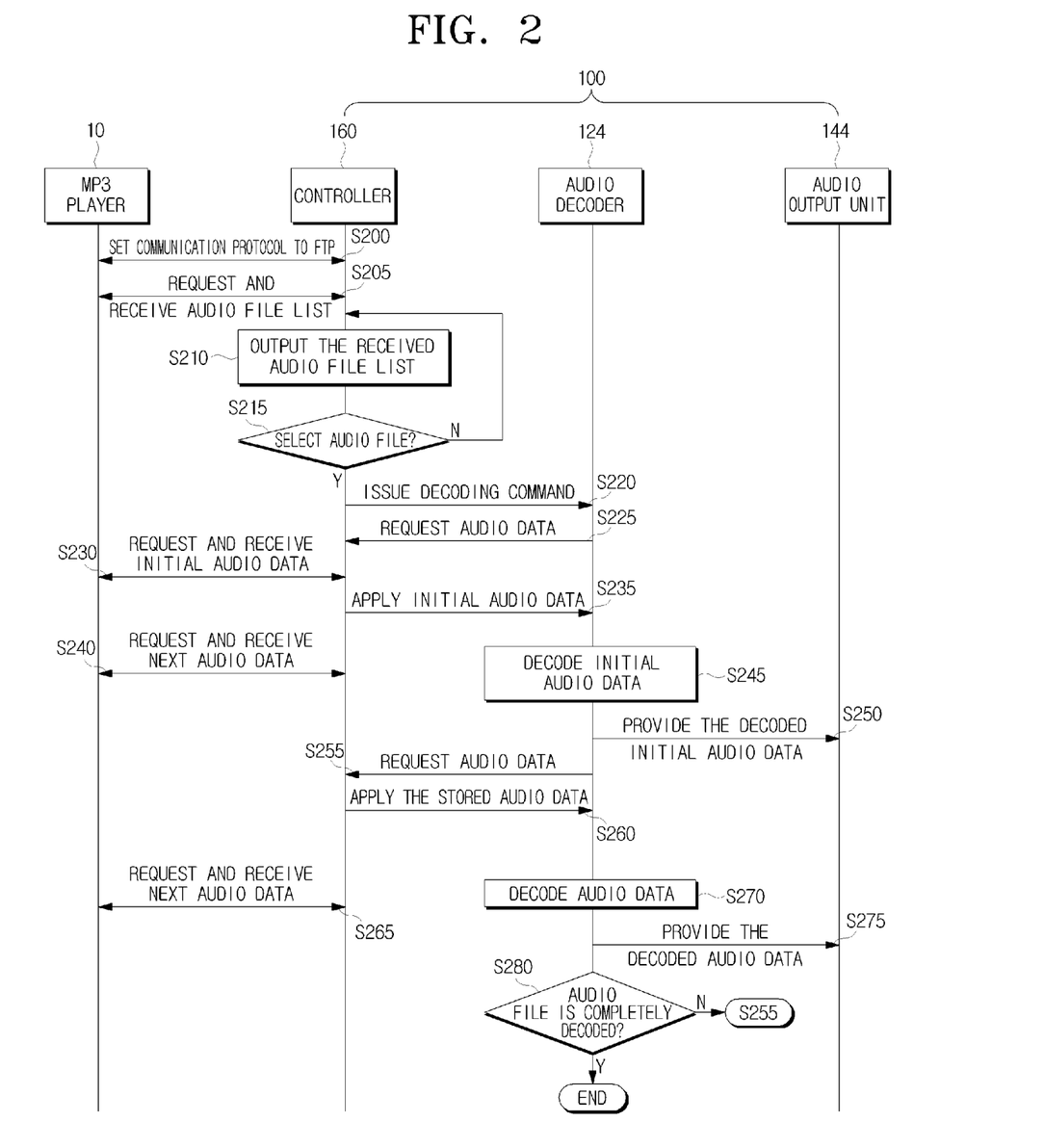
FIG. 2 is a flowchart of a real time reproduction of an audio file being received at the DTV of FIG. 1 according to FTP.

Now, descriptions explain how the DTV 100 of FIG. 1 reproduces the audio file being received according to the FTP, in real time, that is, how the DTV 100 reproduces the audio file in real time before all of the audio data constituting the audio file is completely received by referring to FIG. 2.

As shown in FIG. 2, the controller 160 sets the FTP as the communication protocol between the DTV 100 and the MP3 player 10 (operation S200). The controller 160 requests the audio file list to the MP3 player 10 via the Bluetooth communication module 150 and receives the audio file list (operation S205). Herein, the 'audio file list' indicates the list of the audio files stored to the MP3 player 10.

The communication protocol between the DTV 100 and the MP3 player 10 is set to the FTP in operation S200, and the FTP supports a function enabling the DTV 100 to receive a file list of the connected device. Accordingly, the controller 160 is able to request and receive the audio file list from the MP3 player 10 in operation S205.

Next, the controller 160 controls the GUI generator 130 to output the audio file list received in operation S205 through the video output unit 142 (operation S210). When the user selects one of the audio files in the audio file list displayed in operation S210 (operation S215-Y), the controller 160 issues a decoding command to the audio decoder 124 (operation S220).

The audio decoder 124 requests audio data to be decoded to the controller 160 (operation S225). The audio decoder 124 requests the audio data to be decoded to the controller 160 because a buffer (not shown) of the audio decoder 124 is unable to hold audio data to be decoded.

Upon receiving the request from the audio decoder 124, the controller 160 requests and receives initial audio data from the MP3 player 10 via the Bluetooth communication module 150, and stores the received initial audio data to the buffer 170 (operation S230). The 'initial audio data' indicates audio data at the foremost location in the audio data constituting the audio file selected by the user in operation S215.

Since the communication protocol between the DTV 100 and the MP3 player 10 is defined as the FTP in operation S200, the initial audio data is received according to the FTP in operation S230.

When the initial audio data is completely stored to the buffer 170, the controller 160 applies the initial audio data stored to the buffer 170 to the audio decoder 124 (operation S235). Next, the controller 160 requests and receives next audio data from the MP3 player 10 via the Bluetooth communication module 150, and stores the received next audio data to the buffer 170 (operation S240).

The 'next audio data' indicates audio data directly after the most recently received audio data in the file structure. Since the communication protocol between the DTV 100 and the MP3 player 10 is defined as the FTP in operation S200, the next audio data is also received according to the FTP in operation 240, as in operation S230.

After the operation S235, the audio decoder 124 decodes and converts the initial audio data into a reproducible format (operation S245). The completion of the operation S235 denotes the completion of storing the initial audio data in the buffer of the audio decoder 124.

After the operation S245, the audio decoder 124 provides the decoded initial audio data to the audio output unit 144 (operation S250). After the operation S250, the audio decoder 124 requests the next audio data to be decoded from the controller 160 (operation S255).

The execution of operation S255 should occur right after the completion of the operation S250. After the operation S255, the audio decoder 124 stops the decoding operation until the next audio data is received.

The controller 160, receiving the request from the audio decoder 124, sends the audio data stored in the buffer 170 to the audio decoder 124 (operation S260). Next, the controller 160 requests and receives next audio data from the MP3 player 10 via the Bluetooth communication module 150, and stores the received next audio data in the buffer 170 (operation S265).

As mentioned above, the next audio data indicates audio data directly after the most recently received audio data in the file structure, and the next audio data is also received according to the FTP in operation S265 as in the operations S230 and S240. If all of the audio data constituting the audio file is completely received, the operation S265 is not carried out.

After the operation S260, the audio decoder 124 decodes and converts the sent audio data into a reproducible format (operation S270). Next, the audio decoder 124 provides the decoded audio data to the audio output unit 144 (operation S275).

When all of the audio data constituting the audio file is not completely decoded (operation S280-N), the operation S255 is resumed.

During the above operations, the audio output unit 144 reproduces and outputs the decoded audio data provided in operations S250 and S275 in real time.

As the communication protocol between the DTV 100 and the MP3 player 10 is designated to the FTP in operation S200, to conform to the FTP, the audio data is decoded after all audio data constituting the audio file is fully received. However, in this exemplary embodiment of the present invention, it is implemented to enable to reproduce the audio file being received according to the FTP in real time by 1) sending the audio data completely received from the MP3 player 10 to the audio decoder 124 (operations S235 and S260) and 2) decoding the sent audio data at the audio decoder 124 (operations S245 and S270) right away.

In this exemplary embodiment of the present invention, the audio file comprises the plurality of audio data. The size of the audio data is not fixed but can be determined by taking into account the specification of the audio file, the communication protocol, and the capabilities of the MP3 player and the DTV. Note that the size of the audio data can be changed according to the condition of the radio channel.

In this exemplary embodiment of the present invention, the audio data transmitted from the MP3 player to the DTV at a time are decoded all together. That is, to ease the understanding, the reception unit and the decoding unit of the audio file are set to one identical audio data by way of example. Accordingly, the reception unit and the decoding unit of the audio file may differ from each other. For instance, one audio data is transmitted from the MP3 player to the DTV at a time, and half of the audio data is decoded at a time. In this case, the received audio data not being decoded is buffered.

In this exemplary embodiment of the present invention, while the initial audio data is received and stored and then next audio data is further received and stored, the number of the next audio data, which is further received and stored after the initial audio data is received and stored, can be changed. In a poor channel condition, it may be desirable to increase the number of the next audio data.

Figure 3:
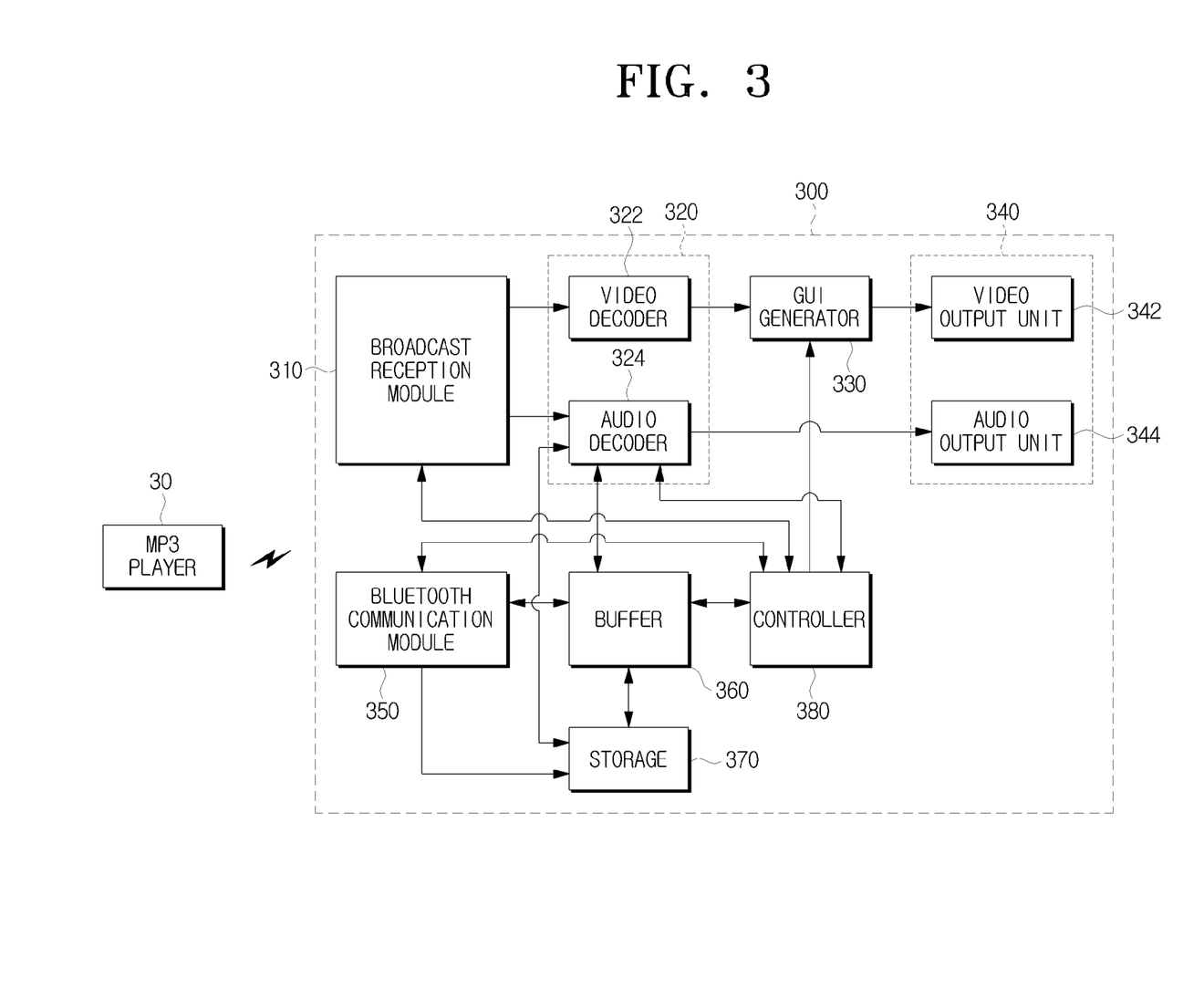
FIG. 3 is a block diagram of a DTV according to another exemplary embodiment of the present invention.

Now, another exemplary embodiment of the present invention is described in detail by referring to FIG. 3. FIG. 3 is a block diagram of a DTV according to another exemplary embodiment of the present invention. Similar to the DTV 100 of FIG. 1, the DTV 300 of FIG. 3 can receive and provide a broadcast to a user. Also, the DTV 300 of FIG. 3 can seamlessly reproduce an audio file, which is received from an MP3 player 30 connected by radio, in real time.

The DTV 300 can seamlessly reproduce the audio file which is being received according to the non real time transfer protocol FTP, in real time. In detail, the DTV 300 can seamlessly reproduce a file being received according to the FTP which is the protocol not supporting the multimedia streaming, in real time.

As shown in FIG. 3, the DTV 300 comprises a broadcast reception module 310, a decoder 320, a GUI generator 330, an output unit 340, a Bluetooth communication module 350, a buffer 360, a storage unit 370, and a controller 380.

The broadcast reception module 310 receives a broadcast signal from a broadcast station or a satellite in a wired or wireless manner. The broadcast reception module 310 divides the received broadcast signal to video data, audio data, and other data, and outputs the divided data.

The decoder 320 decodes the divided data. The decoder 320 comprises a video decoder 322 and an audio decoder 324.

The video decoder 322 converts the input video data into a reproducible format by decoding the video data. The audio decoder 324 converts the input audio data into a reproducible format by decoding the audio data. The video decoder 322 and the audio decoder 324 can receive data from the broadcast reception module 310, or fetch data from the buffer 360, which will be explained.

The GUI generator 330 generates GUI to be displayed on a screen and adds the generated GUI to the video which is decoded and output from the video decoder 322.

The output unit 340 outputs video and audio. The output unit 340 comprises a video output unit 342 and an audio output unit 344.

The video output unit 342 displays the video comprising the GUI output from the GUI generator 330 on a display (not shown), or outputs the video to an external device (e.g., another DTV) connected through an external output port (not shown).

The audio output unit 344 outputs the audio output from the audio decoder 324 through a speaker (not shown), or outputs the audio to an external device connected through an external output port (not shown).

The Bluetooth communication module 350 is connected to the MP3 player 30, which is a kind of Bluetooth device, to wirelessly communicate with the MP3 player 350 in the Bluetooth protocol.

The controller 380 controls overall operation of the DTV 300. Specifically, the controller 380 controls the broadcast reception of the broadcast reception module 310, the communication of the Bluetooth communication module 350, the GUI generation of the GUI generator 330, and so forth.

Particularly, the controller 380 controls the Bluetooth communication module 350 to store the audio data received from the MP3 player 30 via the Bluetooth communication module 350, in the buffer 360 or the storage unit 370.

The buffer 360 is a storage medium which stores the received audio data in a First-In First-Out (FIFO) manner.

The storage unit 370 can be implemented using a recording medium (not shown) such as memory or Hard Disk Drive (HDD), and a controller (not shown) for storing or reading audio data to and from the recording medium.

In another exemplary embodiment of the present invention, the audio data indicates part of the audio file. That is, the audio file can comprise a plurality of audio data. When the audio file is transmitted to the DTV 300, the MP3 player 30 divides the audio file to several audio data and transmits the divided audio data to the DTV 300 one by one.

To reproduce the audio file in real time, the audio data received via the Bluetooth communication module 350 is stored in the buffer 360 under the control of the controller 380. By contrast, to reproduce the audio file in non real time (to reproduce the audio file after all of audio data constituting the audio file is received), the audio data received via the Bluetooth communication module 350 are stored in the storage unit 370 under the control of the controller 380.

In both cases where the audio file is reproduced in real time and in non real time, the audio file is received from the MP3 player 30 via the Bluetooth communication module 350 according to the FTP. Namely, the audio data of the audio file to be reproduced in real time are received according to the FTP as well.

Figure 4:
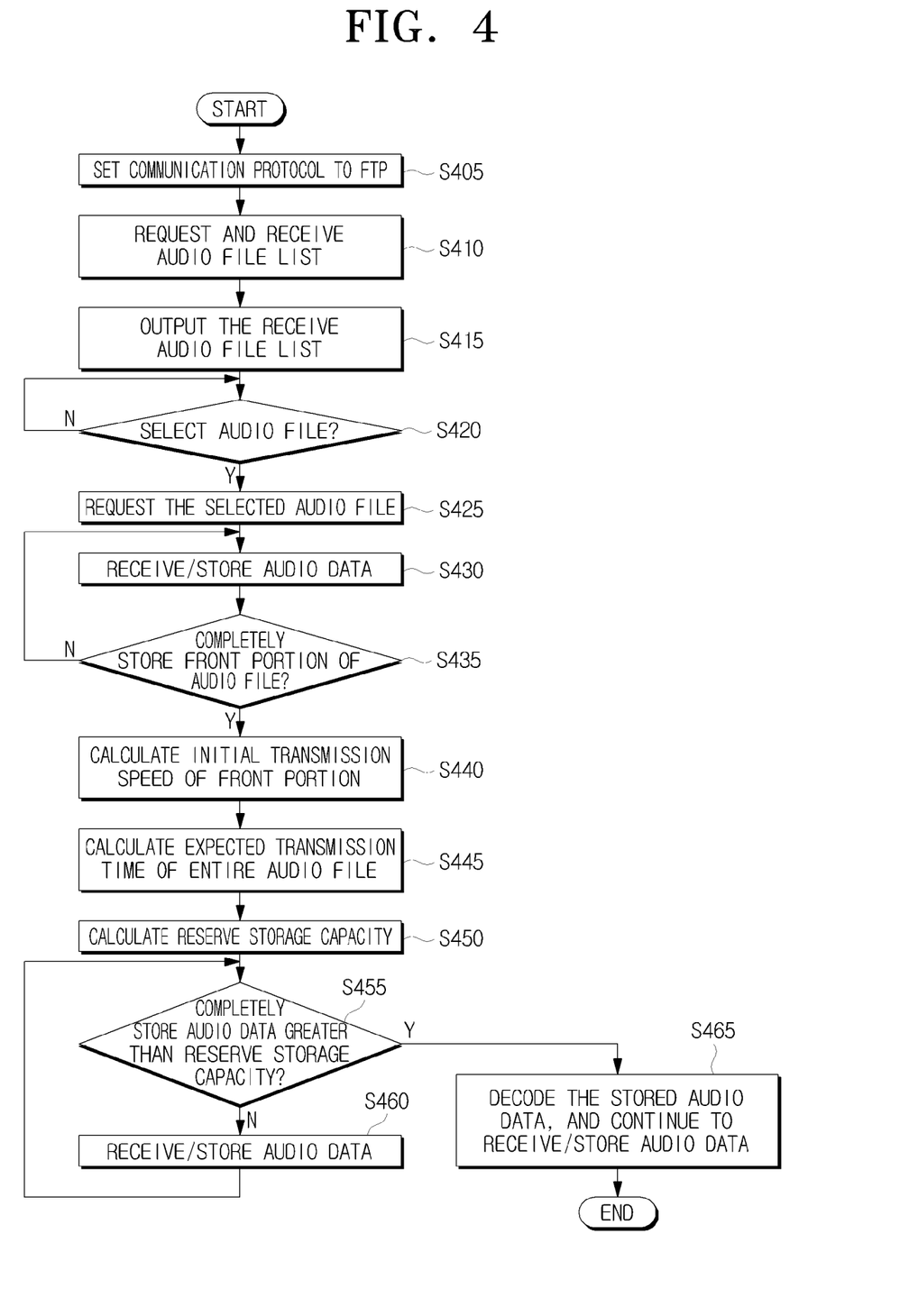
FIG. 4 is a flowchart of a seamless real time reproduction of an audio file being received at the DTV of FIG. 3 according to FTP.

Hereafter, descriptions explain how the DTV 300 of FIG. 3 seamlessly reproduces the audio file being received according to the FTP in real time by referring to FIG. 4.

In FIG. 4, the controller 380 designates the FTP as the communication protocol between the DTV 300 and the MP3 player 30 (operation S405). The controller 380 requests and receives an audio file list from the MP3 player 30 via the Bluetooth communication module 350 (operation S410). Herein, the 'audio file list' indicates a list of audio files stored to the MP3 player 30.

The communication protocol between the DTV 300 and the MP3 player 30 is set to the FTP in operation S405, and the FTP supports a function of receiving the file list of the connected device. Hence, the controller 380 is able to request and receive the audio file list from the MP3 player 30 in operation S410.

Next, the controller 380 controls the GUI generator 330 to output the received audio file list through the video output unit 342 (operation S415). When the user selects one of the audio files in the audio file list displayed on the screen (operation S420-Y), the controller 380 requests the selected audio file to the MP3 player 30 via the Bluetooth communication module 350 (operation S425).

In response to the operation S425, audio data constituting the selected audio file are received from the MP3 player 30 via the Bluetooth communication module 350 and stored in the buffer 360 (operation S430).

Since the communication protocol between the DTV 300 and the MP3 player 30 is set to the FTP in operation S405, the request in operation S425 and the reception in operation S430 are performed according to the FTP.

During the operation S430, the controller 380 determines whether the front portion of the audio file is completely stored in the buffer 360 (operation S435).

The 'front portion of the audio file' (hereafter, referred to as a front portion) can be arbitrary defined. For instance, 5% of the audio file can be set to the front portion. In this case, when the number of audio data constituting the audio file is 400, the front portion ranges from the first audio data to the $20^{th}$ audio data.

Determining that the front portion is not completely stored in the buffer 360 (operation S435-N), the operation S430 is repeated.

Determining that the front portion is completely stored in the buffer 360 (operation S435-Y), the controller 380 calculates an initial transmission speed of the front portion using the storage capacity of the front portion completely stored and a time taken to completely store the front portion (operation S440).

In operation S440, the initial transmission speed can be calculated by dividing the 'storage capacity of the front portion completely stored' by the 'time taken to completely store the front portion' as expressed in Equation 1.

$$\text{initial transmission speed} = \frac{\text{storage capacity of front portion completely stored}}{\text{time to taken to completely store the front portion}} \quad \text{[Equation 1]}$$

Next, the controller 380 calculates an expected transmission time of the entire audio file using the initial transmission speed calculated in operation S440 and the total capacity of the audio file selected in operation S420 (operation S445).

Herein, the 'expected transmission time of the entire audio file' (hereafter, referred to as an 'expected transmission time') is an expected time taken to receive the entire audio file through the Bluetooth communication module 350 and completely store the audio file in the buffer 360.

Information relating to the total capacity of the audio file is recorded in the front portion of the audio file, and thus can be extracted therefrom. The expected transmission time can be calculated by dividing the total capacity of the audio file by the initial transmission speed as expressed in Equation 2.

$$\text{expected transmission time} = \frac{\text{total capacity of audio file}}{\text{initial transmission speed}} \quad \text{[Equation 2]}$$

Next, the controller 380 calculates a reserve storage capacity using the expected transmission time calculated in operation S445, the reproduction time of the audio file selected in operation S420, and the initial transmission speed calculated in operation S440 (operation S450).

The reserve storage capacity is a storage capacity to enable the seamless reproduction of the audio file selected in operation S420 in real time. To seamlessly reproduce the audio file in real time, an amount of audio data of the audio file selected in operation S420 needs to be stored in the buffer 360 up to the reserve storage capacity before the audio decoder 324 decodes the audio data.

In other words, when the audio decoder 324 starts to decode the audio data after the audio data of the audio file selected in operation S420 are completely stored to the buffer 360 up to the reserve storage capacity, the audio can be reproduced seamlessly.

Information relating to the reproduction time of the audio file is recorded in the front portion of the audio file. Hence, the information can be extracted from the front portion or calculated by dividing the total capacity of the audio file by the coding rate of the audio file.

The reserve storage capacity can be calculated by multiplying a time acquired by subtracting the reproduction time of the audio file from the expected transmission time, by the initial transmission speed as expressed in Equation 3.

reserve storage capacity=(expected transmission time−reproduction time of audio file)*initial transmission speed [Equation 3]

Hereafter, to ease the understanding of the exemplary embodiment of the present invention, it is assumed that the total capacity of the audio file is 4 Mb, the reproduction time of the audio file is 200 s, and the initial transmission speed calculated in operation S435 is 19 Kbps. The expected transmission time is 211 s (=4 Mb/19 Kbps) based on Equation 2, and the reserve storage capacity is 209 Kb (=(211 s−200 s)*19 Kbps) based on Equation 3.

Next, the controller 380 determines whether audio data greater than the reserve storage capacity is completely stored (operation S455). Upon determining that audio data greater than the reserve storage capacity is not completely stored (operation S455-N), the controller 380 controls the Bluetooth communication module 350 to keep receiving the audio data from the MP3 player 30 and to store the audio data in the buffer 160 (operation S460).

In contrast, when determining the complete storage of audio data greater than the reserve storage capacity (operation S455-Y), the controller 380 controls the audio decoder 324 to commence the decoding of the audio data stored in the buffer 360 and controls the Bluetooth communication module 350 to keep receiving the audio data from the MP3 player 30 and to store the audio data in the buffer 160 (operation S465).

As one can see from operation S465, the audio data reception and storing by the Bluetooth communication module 350 and the audio data decoding by the audio decoder 324 are carried out together after a certain time.

In more detail, after audio data greater than the reserve storage capacity are completely stored in the buffer 360, the audio data is decoded at the audio decoder 324 while the audio data is being received and stored at the Bluetooth communication module 350. In other words, in the process of the audio data decoding at the audio decoder 324, the audio data is received and stored at the Bluetooth communication module 350.

The audio data, which is decoded by the audio decoder 324 and converted into the reproducible format in operation S465, is applied to the audio output unit 344 and reproduced through a speaker in real time.

In operation S405, the communication protocol between the DTV 300 and the MP3 player 30 is set to the FTP. To conform to the FTP, the audio data is decoded after every audio data constituting the audio file is completely received.

However, in another exemplary embodiment of the present invention, the stored audio data is decoded when 1) the reception and storing of the audio data is performed together with the audio data decoding, that is, the audio data is decoded during the process of audio data reception and storing, and 2) audio data greater than the reserve storage capacity is completely stored in the buffer. Therefore, the audio can be reproduced seamlessly in real time.

While the decoding of the stored audio data is commenced when audio data greater than the reserve storage capacity is completely stored in the buffer in another exemplary embodiment of the present invention, it is possible to commence the decoding of the stored audio data when audio data over 120% of the reserve storage capacity is completely stored in the buffer so as to further lower the probability of the interrupted audio reproduction.

In another exemplary embodiment of the present invention, the audio file comprises the plurality of audio data. Note that the size of the audio data is not fixed but can be set by taking into account the specification of the audio file, the communication protocol, and the capabilities of the MP3 player and the DTV. Also, the size of the audio data can be changed according to the radio channel condition.

The reception unit of the audio file may differ from the decoding unit of the audio file. For instance, one audio data is transmitted from the MP3 player to the DTV at one time, and only half of the audio data is decoded at one time. In this case, the received audio data being not decoded is left in the buffer.

So far, the real time reproduction of the file being received according to the non real time transfer protocol has been illustrated.

In the exemplary embodiments of the present invention, while the audio file received according to the FTP is reproduced in real time by way of example, the present invention is applicable to a video file in addition to the audio file.

In the exemplary embodiments of the present invention, the FTP is a kind of the non real time transfer protocol, and the present invention is applicable to other non real time transfer protocol.

While the radio communication between the MP3 player and the DTV is performed in the Bluetooth manner in the exemplary embodiments of the present invention, the Bluetooth scheme is used merely as an example of the radio communication scheme. The present invention is applicable to other wireless or wired communications between the MP3 player and the DTV.

Also, the MP3 player is merely an example of the external device connectable to the DTV, and other external device than the MP3 player can be adopted. The DTV is a kind of video apparatus, and the present invention is applicable to other video apparatus than the DTV.

Figure 5:
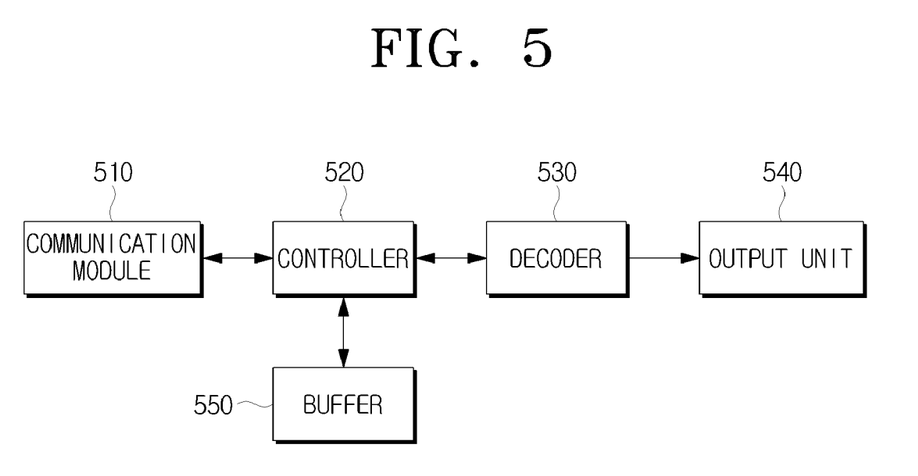
FIG. 5 is a block diagram of a video apparatus according to yet another exemplary embodiment of the present invention.
Figure 6:
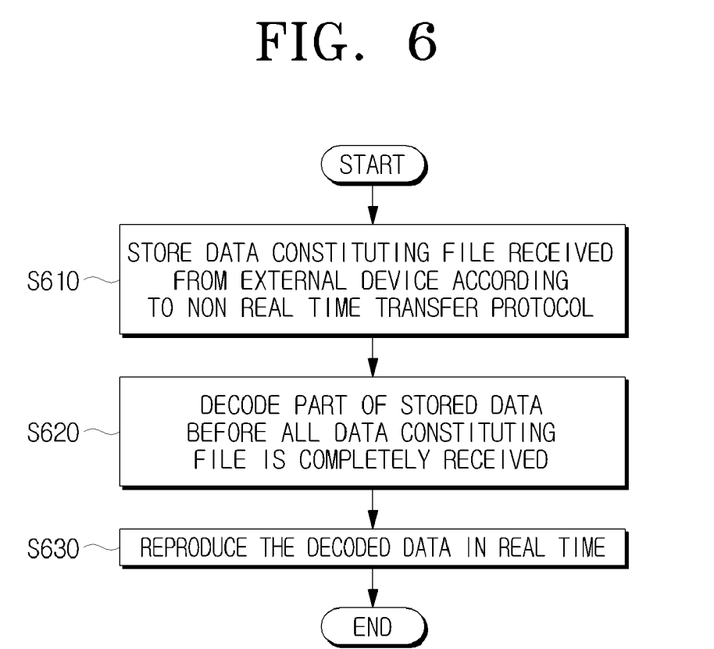
FIG. 6 is a flowchart of a real time reproduction of a file being received at the video apparatus of FIG. 5 according to a non real time transfer protocol.

Hereafter, yet another exemplary embodiment of the present invention is illustrated by referring to FIGS. 5 and 6.

As shown in FIG. 5, a video apparatus according to yet another exemplary embodiment of the present invention comprises a communication module 510, a controller 520, a decoder 530, an output unit 540, and a buffer 550.

The communication module 510 is connected to an external device to communicate with the external device. The buffer 550 is a storage medium for storing data received through the communication module 510. The decoder 530 decodes the applied data.

The controller 520 stores data constituting a file received from the external device via the communication module 510 according to a non real time transfer protocol, in the buffer 550. Before every data constituting the file is completely stored, the controller 520 sends part of the data stored in the buffer 550 to the decoder 530.

The output unit 540 reproduces the data decoded at the decoder 530 in real time.

In a reproduction method of FIG. 6, the video apparatus stores data constituting a file received from the external device according to the non real time transfer protocol (operation S610). Next, the video apparatus decodes part of the stored data before all of data constituting the file is completely received (operation S620). The video apparatus reproduces the decoded data in real time (operation S630).

Figure 7:
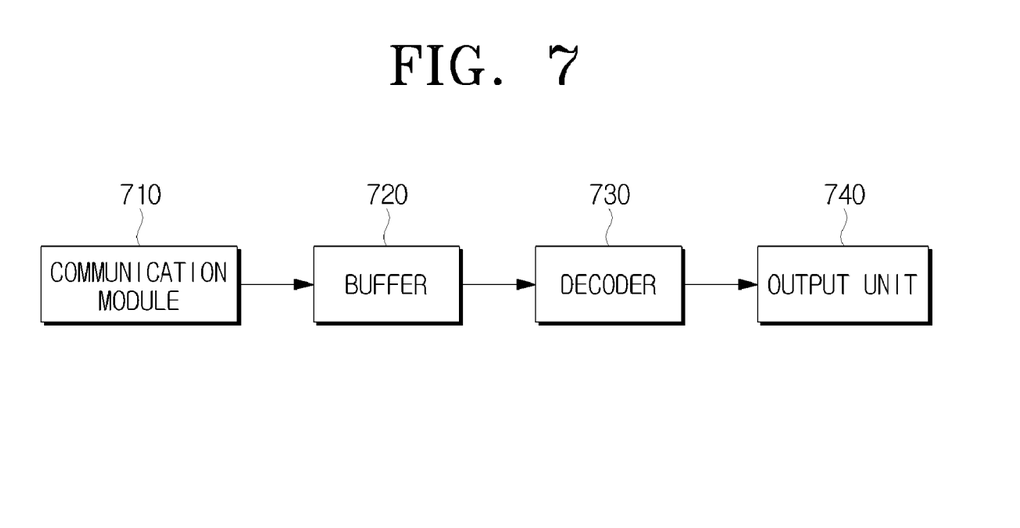
FIG. 7 is a block diagram of a video apparatus according to still another exemplary embodiment of the present invention.
Figure 8:
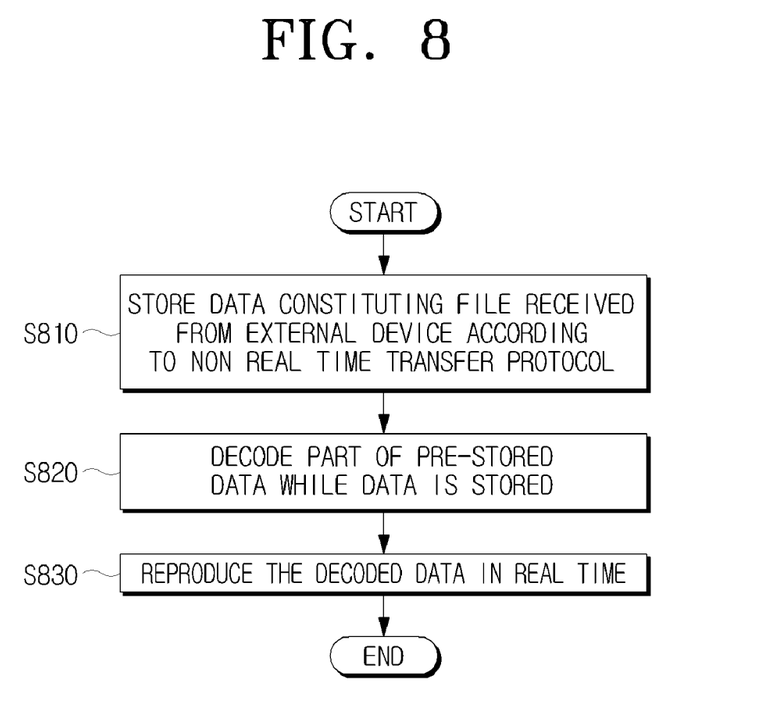
FIG. 8 is a flowchart of a seamless real time reproduction of a file being received at the video apparatus of FIG. 7 according to a non real time transfer protocol.

Now, still another exemplary embodiment of the present invention is illustrated by referring to FIGS. 7 and 8.

A video apparatus of FIG. 7 comprises a communication module 710, a buffer 720, a decoder 730, and an output unit 740.

The communication module 710 is connected to an external device to communicate with the external device. The buffer 720 stores data received through the communication module 710.

The decoder 730 decodes part of data stored in the buffer 720 while data constituting a file received from the external device via the communication module 710 according to the non real time transfer protocol are stored in the buffer 720.

The output unit 740 reproduces the data decoded at the decoder 760 in real time.

In a reproduction method of FIG. 8, the video apparatus receives and stores data constituting a file from the external device according to the non real time transfer protocol (operation S810). As the data is being stored, the video apparatus decodes part of pre-stored data (operation S820). Next, the video apparatus reproduces the decoded data in real time (operation S830).

Figure 9:
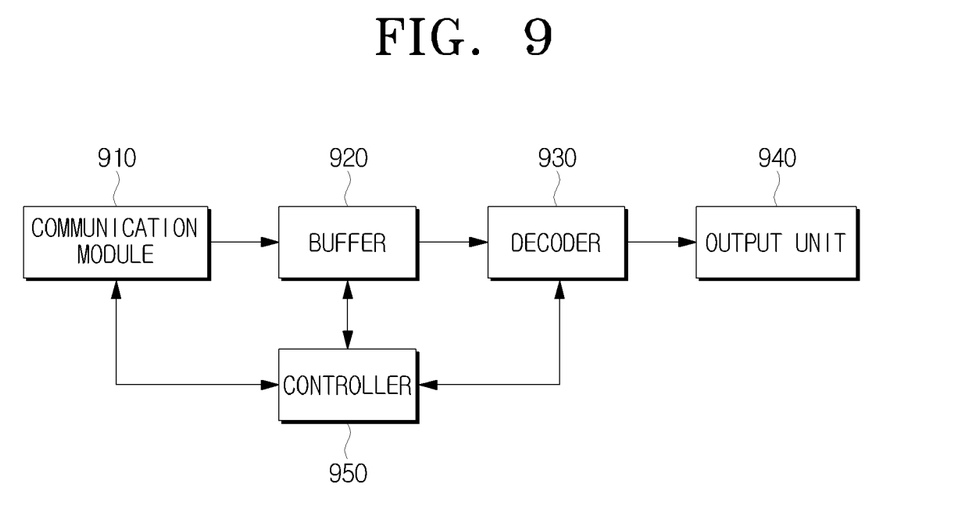
FIG. 9 is a block diagram of a video apparatus according to a further exemplary embodiment of the present invention.
Figure 10:
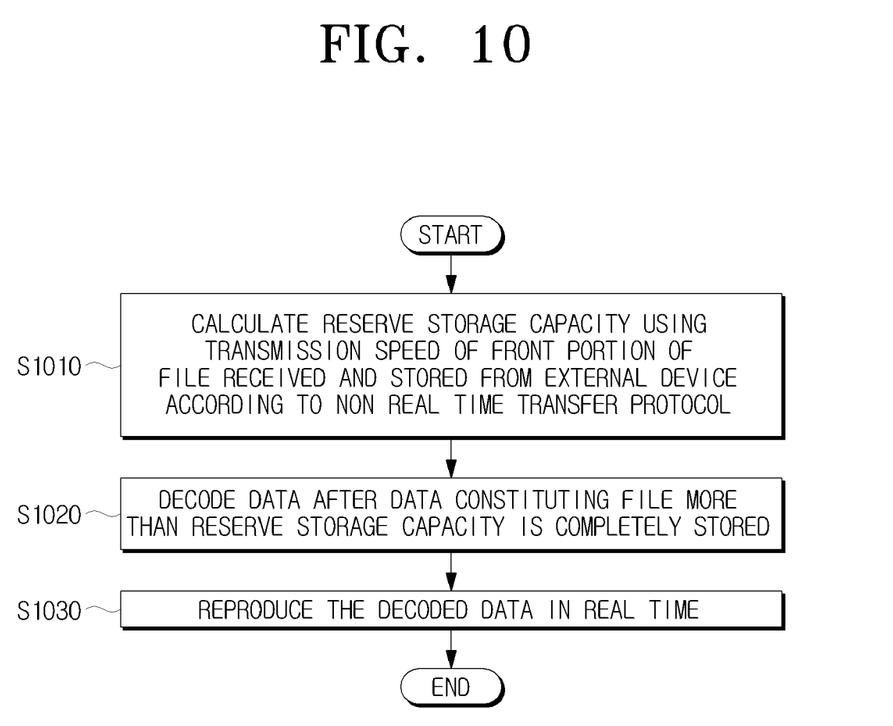
FIG. 10 is a flowchart of a seamless real time reproduction of a file being received at the video apparatus of FIG. 9 according to a non real time transfer protocol.

Hereafter, a further exemplary embodiment of the present invention is described by referring to FIGS. 9 and 10.

A video apparatus of FIG. 9 comprises a communication module 910, a buffer 920, a decoder 930, an output unit 940, and a controller 950.

The communication module 910 is connected to an external device to communicate with the external device. The buffer 920 stores data constituting a file received from the external device via the communication module 910 according to the non real time transfer protocol.

The decoder 930 decodes part of data stored in the buffer 920. The output unit 940 reproduces the data decoded at the decoder 930 in real time.

The controller 950 calculates a reserve storage capacity using a transmission speed of the front portion of the file received through the communication module 910 and stored to the buffer 920, and controls the decoder 930 to commence the decoding after data constituting the file greater than the reserve storage capacity is completely stored to the buffer 920.

In a reproduction method of FIG. 10, the video apparatus calculates the reserve storage capacity using the transmission speed of the front portion of the file received and stored from the external device according to the non real time transfer protocol (operation S1010).

The video apparatus commences the decoding after the data constituting the file is completely stored beyond the reserve storage capacity (operation S1020). Next, the video apparatus reproduces the decoded data in real time (operation S1030).

Therefore, the file being received according to the non real time transfer protocol can be reproduced in real time.

As set forth above, the file being received according to the non real time transfer protocol can be reproduced in real time. Hence, it is possible to reproduce in real time the file received from the external device which does not support the communication of the real time transfer protocol but merely supports the file transmission according to the non real time transfer protocol.

When the file is reproduced in real time, the list of the files stored to the storage device is provided user, to thus increase the user convenience.

In addition, the audio is seamlessly reproduced in real time by performing the data reception and storing together with the data decoding, that is, by decoding the audio data in the process of the data reception/storing.

Furthermore, the audio is seamlessly reproduced in real time by commencing the decoding of the stored audio data when data greater than the reserve storage capacity is completely stored in the buffer.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus comprising:
   a communication module which is connected to an external device to communicate with the external device;
   a buffer which stores data received through the communication module;
   a decoder which decodes input data;
   a controller which stores data constituting a file received from the external device in the buffer via the communication module according to a non real time transfer protocol, and inputs a part of the data stored in the buffer to the decoder before all of data constituting the file is completely received; and
   an output unit which reproduces data decoded at the decoder in a real time.

2. The apparatus of claim 1, wherein the non real time transfer protocol does not support a multimedia streaming.

3. The apparatus of claim 1, wherein the non real time transfer protocol is a File Transfer Protocol (FTP).

4. The apparatus of claim 1, wherein the controller controls the communication module to receive a list of files stored in the external device from the external device according to the non real time transfer protocol, and to output the received list through the output unit.

5. The apparatus of claim 1, wherein, when data inputted from the controller is completely decoded, the decoder provides the decoded data to the output unit and requests additional data to be decoded from the controller.

6. The apparatus of claim 1, wherein the communication module is connected to the external device to enable radio communication with the external device.

7. The apparatus of claim 6, wherein the communication module is connected to the external device to enable radio communication using Bluetooth.

8. A reproduction method comprising:
   storing data constituting a file which is received from an external device according to a non real time transfer protocol;
   decoding part of the data being stored before all of the data constituting the file is completely received; and
   reproducing the decoded data in real time.

9. The reproduction method of claim 8, wherein the non real time transfer protocol does not support a multimedia streaming.

10. The reproduction method of claim 8, wherein the non real time transfer protocol is a File Transfer Protocol (FTP).

11. The reproduction method of claim 8, further comprising:
   receiving a list of files stored in the external device from the external device according to the non real time transfer protocol; and
   outputting the received list.

12. The reproduction method of claim 8, wherein the decoding operation comprises:
   transmitting, by a controller which stores the data constituting the received file in a buffer, part of the data stored in the buffer to a decoder which decodes the data before all of the data constituting the file is completely received;
   decoding, by the decoder, the data transmitted from the controller;
   when the data applied from the controller is completely decoded, providing, by the decoder, the decoded data to an output unit which reproduces the decoded data in real time; and
   requesting, by the decoder, additional data to be decoded to the controller.

13. The reproduction method of claim 8, wherein the storing operation comprises storing data constituting a file which is wirelessly received from the external device.

14. The reproduction method of claim 13, wherein the storing operation comprises storing data constituting a file which is wirelessly received from the external device using Bluetooth.

15. The reproduction method of claim 8, wherein an amount of data is pre-stored, and the pre-stored data is decoded while the data constituting a file is stored.

16. The reproduction method of claim 15, wherein the decoding operation comprises:
   receiving and storing data from the external device according to the non real time transfer protocol even while part of pre-stored data is decoded.

17. The reproduction method of claim 15, wherein the decoding operation starts to decode part of the pre-stored data after an amount of data of the file is completely stored and is greater than a reserve storage capacity.

18. The reproduction method of claim 17, further comprising:
   calculating the reserve storage capacity using a transmission speed of a front portion of the file.

19. An apparatus comprising:
   a communication module which is connected to an external device to communicate with the external device;
   a buffer which stores data received through the communication module;
   a decoder which decodes part of data stored in the buffer while the data constituting a file received from the external device via the communication module according to a non real time transfer protocol, are stored in the buffer; and
   an output unit which reproduces the data decoded at the decoder in real time.

20. The apparatus of claim 19, wherein the communication module receives data from the external device according to the non real time transfer protocol even while the decoder decodes the data.

21. The apparatus of claim 19, further comprising:
   a controller which controls the decoder to commence the decoding after an amount of data of the file greater than a reserve storage capacity is completely stored in the buffer.

22. The apparatus of claim 19, wherein the controller calculates the reserve storage capacity using a transmission speed of a front portion of the file which is received through the communication module and stored in the buffer.

23. An apparatus comprising:
   a communication module which is connected to an external device to communicate with the external device;
   a buffer which stores data constituting a file which is received from the external device through the communication module according to a non real time transfer protocol;
   a decoder which decodes part of data stored in the buffer;
   an output unit which reproduces data decoded at the decoder in real time; and
   a controller which calculates a reserve storage capacity using a transmission speed of a front portion of the file which is received through the communication module and stored in the buffer, and controls the decoder to commence the decoding after the data constituting the file greater than the reserve storage capacity is completely stored in the buffer.

24. A reproduction method comprising:

calculating a reserve storage capacity using a transmission speed of a front portion of a file which is received from an external device according to a non real time transfer protocol and stored;

starting to decode the file after an amount of data, constituting the file, is completely stored and is greater than the reserve storage capacity; and reproducing the decoded data in real time.

* * * * *